United States Patent [19]

Karlsson

[11] Patent Number: 4,941,938

[45] Date of Patent: Jul. 17, 1990

[54] METHOD OF JOINING MATERIALS

[75] Inventor: Ingvar Karlsson, Bandhagen, Sweden

[73] Assignee: Casco Nobel AB, Stockholm, Sweden

[21] Appl. No.: 216,719

[22] PCT Filed: Feb. 10, 1987

[86] PCT No.: PCT/SE87/00061

§ 371 Date: Jul. 6, 1988

§ 102(e) Date: Jul. 6, 1988

[87] PCT Pub. No.: WO87/05041

PCT Pub. Date: Aug. 27, 1987

[30] Foreign Application Priority Data

Feb. 17, 1986 [SE] Sweden .................................. 8600694

[51] Int. Cl.$^5$ .............................................. B32B 31/00
[52] U.S. Cl. ................................... 156/281; 156/184;
156/192; 156/276; 156/307.5; 156/308.6;
156/3.9; 156/331.3; 252/194; 427/333;
427/340; 427/341; 428/420

[58] Field of Search ............... 156/184, 276, 192, 281,
156/319, 308.6, 331.3, 307.5; 427/333, 340, 341;
428/420; 252/194

[56] References Cited

U.S. PATENT DOCUMENTS

| | | | |
|---|---|---|---|
| 2,410,586 | 11/1946 | McGarvey | 156/319 |
| 3,574,662 | 4/1971 | Gage | 427/341 |
| 3,941,632 | 3/1976 | Swedenberg et al. | 427/333 |

FOREIGN PATENT DOCUMENTS 1145212  4/1983  Canada ............................ 156/331.3

*Primary Examiner*—John J. Gallagher
*Attorney, Agent, or Firm*—Fred Philpitt

[57] ABSTRACT

This invention relates to a method of joining two or more surfaces together by applying to at least one of the surfaces a water-based adhesive or an adhesive which liberates water during curing, and generating salt during the course of the joining operation, which salt will bind water that is present during the joining as water of crystallization.

11 Claims, No Drawings

METHOD OF JOINING MATERIALS

The present invention relates to a method of binding water upon the joining of materials using water-based adhesives or adhesives which liberate water during curing. More particularly, the invention relates to such a method wherein water is bound to a compound in the form of water of crystallization. The method of the invention can be utilized in many fields, such as for example in the production of composite wood and wood-based materials, in the production of cellulose-based board materials, in the bonding of carpets to different kinds of substrates, and in other types or bonding operations, such as mounting and renovation. The method of the invention is particularly suitable for gluing of dense materials and at thick glue joints, and another field in which the present method is very advantageous is in the production of paper cores for the paper industry.

Different kinds of binders and adhesives which solidify and give the desired glue joint through release of water are per se well known and used in a number of fields. "Drying" adhesives in which the binder is dispersed or dissolved in water give a joint by release of water and the formation of a continuous phase without any actual chemical reaction. For curable adhesives the transformation to a solid phase, or the development of the binding capability, includes a chemical reaction. Several types of water-based curable adhesives and adhesives which liberate water during the curing exist, and they are usually used in the form of two-component systems, i.e. in the form of a resin which during the joining is mixed with or applied in combination with a hardener. While drying adhesives are mainly used for the gluing of paper, wallpaper, floors and similar products, curable adhesives such as formaldehyde-based amino- and phenolic resins are mainly used for bonding wood, wood-based and cellulose-based materials.

A common problem when using adhesives which are water-based and/or liberate water during curing is that the water as rule must be made to be released as uniformly as possible to give a final strong joint and a joint over the entire intended area in such a manner that the dimensional stability and the strength properties are not negatively influenced. In certain applications, such as for example the production of particle board and plywood, high temperatures and pressures are used in the presses to release the majority of the water, while the release of water in other applications must occur at ambient temperature, or only somewhat elevated temperatures. The simplest way of reducing the drying time is of course to use aqueous adhesive compositions having as high a dry content as possible, but here factors such as distribution at spreading, wetting and penetration impose certain limits, and even when adhesives in more or less entirely dry form are used, these can liberate water during curing which it is desirable to remove. Thus, there remains a desire to remove water in processes for joining wherein water-based adhesives or adhesives which give off water at curing are used, and to do this in such a manner that strength properties and dimensional stability are at least retained.

The present invention offers a method of binding water so that it is not present in free form and need not be removed by heating, prolonged storage, waiting-times, etc., while joining materials using adhesives of the above mentioned types. The method of the present invention can considerably speed up the gluing process. The method of the present invention can be utilized in most types of joining of different kinds of materials and gives great advantages. The method is particularly advantageous for thick glue joints, when bonding wood having poorly treated surfaces or when low pressures are used, for example in bonding processes within buildings, and in the bonding of dense materials, such as the bonding of metal to wood where the problems with water release are particularly pronounced. The method of the present invention is particularly advantageous in the joining of materials which cannot be subjected to high drying temperatures without risking an uneven release of water and wherein very high demands are made on dimensional stability and strength. According to the present invention considerably reduced times for development of the final joint strength, and at the same time a substantial improvement of the joint can be obtained by my joining processes.

The present invention thus relates to method of binding water from the glue joint during the joining of materials using water-based adhesives or adhesives which liberate water during curing, according to which method water is bound as water of crystallization to a compound which is present in at least one of the materials to be joined, or to a compound which is formed in connection with the joining.

The method of the invention can be used in the joining of materials using water-based adhesives and/or adhesives which liberate water at curing. These adhesives can fundamentally be classified as drying adhesives, i.e. adhesives which set by drying, and curable adhesives. According to the present invention a compound which can bind water of crystallization is present during the joining process and thereby a substantial acceleration of the drying or the curing can be obtained for these types of adhesives.

The drying adhesives are aqueous dispersions of particles of natural or synthetic materials or water solutions for which the bonding capability is obtained through release of water and transition to a solid continuous phase. Examples of this type of adhesives are sodium silicate and natural polymers such as animal glue, starch, natural rubber, etc., and synthetic polymers such as synthetic rubber, polyvinyl alcohol, polyvinyl acetate, etc. The drying adhesives are usually used in the form of aqueous dispersions or solutions with dry contents of from about 20 to about 80 percent by weight and the principal applications for these are in the bonding of paper products and other types of lamination processes, in bonding, in renovation and assembling and in other applications where the demands on strength under load and under outdoor conditions are not particularly emphasized.

The curable adhesives give rise to the bonding capability through a chemical reaction which in most cases involves release of water. The curable adhesives are usually used as two-component systems, i.e. in the form of a resin and a hardener for the acceleration of the chemical reaction. When the term "adhesive" is used herein for curable adhesives, this then also includes such two-component systems and also, with regard to the compound which according to the present invention shall be formed, can be present in either of the two components or in both. Examples of this type of adhesives are amino-formaldehyde resins, such as urea-formaldehyde resins and melamine-formaldehyde resins, mixtures and co-condensates of these, phenolic resins and resorcinol resins. Amino-formaldehyde resins are cured under acid conditions while phenolic resins and resorcinol resins in most cases are cured under alkaline or neutral conditions. The curable adhesives are generally used in the form of aqueous solutions of resin and hardener respectively and the dry contents for the resin solutions are generally from about 40 to about 70 percent by weight, and the dry contents for the hardener solutions are generally from about 50 to about 75 percent by weight. It does, however, happen that both resin and hardener are used in dry form. The principal applications for these curable adhesives are in the production of composite cellulose-based board materials, such as particle board and fibre board, and in the production of plywood and wood or wood-based constructions where the demands on strength usually are very high.

According to the present invention water is chemically bound during joining as water of crystallization to one or several compounds, e.g. salts, and this is the fundamental idea behind the present invention. The method of the present invention is thus generally applicable in connection with bonding processes using water-based adhesives, drying and curable adhesives, and the method can be used when bonding different kinds of materials, as stated above. However, the method of the present invention is particularly suitable when curable adhesives are used for the bonding and it is especially advantageous to use as the compound which combines with water of crystallization, or which takes part in a reaction for the formation of one or several such compounds, a compound which also can act as a hardener for the resin.

According to the present invention water from the glue joint is bound by the presence of a compound which can bind water as water of crystallization or by the formation of such a compound, or of course several such compounds, during the bonding. The compound should be able to combine with at least one mole of water per mole, and suitably with at least 4 moles of water, and hereby it is understood that during a reaction for formation of two or more compounds which combine with water of crystallization, these together should combine with at least one mole of water, and preferably with at least 4 moles of water per mole of formed compounds. The compounds which are used for their capability of combining with water of crystallization or for reaction to compounds with this capability are of course selected with regard to the adhesive used in the bonding and with regard to other conditions during the bonding so that negative effects are avoided. Thus, when a curable adhesive is used and the curing is obtained by acidic compounds, as is the case for amino-formaldehyde resins, the compound should be an "acid salt" and hereby is then understood a salt which gives an acid reaction in aqueous solution and thus lowers the pH of the original resin solution. For adhesives which are cured in alkaline or neutral environment, such as phenol and resorcinol resins, "basic or neutral salts" should of course be used, i.e. salts which in aqueous solutions give a neutral or alkaline reaction and thus increase the pH of the original resin solution. When drying adhesives are used, the demands on a pH range during the actual bonding are often not that specific, and salts for the binding of water of crystallization can thus be chosen more freely. As examples of suitable compounds having water of crystallization which can be used according to the invention there can be mentioned: acid salts such as sulphates, particularly different aluminum sulfates, sulphates of alkali metals and alkaline earth metals such as sodium, calcium and magnesium sulphate, and other aluminum compounds, such as for example aluminum chloride and aluminum nitrate. As particularly suitable aluminum sulphates can be mentioned $Al_2(SO_4)_3.18H_2O$, $NaAl(SO_4)_2.12H_2O$, $K_2SO_4.Al_2(SO_4)_3.24H_2O$, $(NH_4)_2SO_4.Al_2(SO_4)_3.24H_2O$. As examples of basic or neutral salts can be mentioned carbonates, halides and phosphates of ammonium, alkali metals and alkaline earth metals. Also, nitrates, nitrites and borates of alkali and alkaline earth metals can for example be used and also, for example, barium hydroxide. As examples of particularly suitable neutral and basic salts can be mentioned: $Ba(OH)_2.8H_2O$, $CaBr_2.6H_2O$, $CaCl_2.6H_2O$, $Ca(NO_2)_2.4H_2O$, $MgBr_2.6H_2O$, $Na_2B_4O_7.10H_2O$, $Na_2CO_3.10H_2O$ and $Na_3PO_4.10H_2O$. The compounds can be added in wholly or partly dehydrated form or be formed in their hydrated form by reaction between added compounds for this formation.

As an example of the formation of compounds with the capability of binding water the following reaction can be given $Al_2(SO_4)_3.18H_2O + 6NaCl \rightarrow 2AlCl_3.6H_2O + 3Na_2SO_4.10H_2O$. As is evident, two compounds are formed in this reaction and the net binding of water in the reaction is 24 moles of $H_2O$. A certain part of the water of crystallization in the aluminum sulphate that is used could be evaporated, for example from material impregnated with this, and thus increase the net amount of bound water of crystallization. The above reaction is particularly advantageous since two compounds which combine with water of crystallization are formed, and also since the original aluminum sulphate and the formed aluminum chloride can act as a hardener when amino-formaldehyde based resins are used.

With regard to the different fields wherein the present method can be utilized, and with regard to the varying molecular weights for compounds which combine with water of crystallization, it is difficult to state general amounts for the addition to the materials or the adhesives. Naturally, as high amounts as possible in each application are used to bind as much water as possible. However, caution must be taken in order not to get a negative influence on the function of the adhesive. The compound or the compounds which are added are suitably used in such amounts that at least 10% of added water and/or formed water is bound, and preferably so that at least 50% of the water is bound.

The actual addition of the compounds can be carried out in several different ways. A compound can for example be mixed into a solution of resin or into a sollution of hardener, or into both. When two compounds capable of forming a compound which binds water of crystallization are mixed in a resin and a hardener the compound which binds water of crystallization is formed when the resin and the hardener are contacted.

It is also possible to mix one of these compounds in the adhesive or a component of the adhesive and add the other compound to one of the materials to be joined, whereby the compound which binds water of crystallization is formed during the joining. The compound which binds water of crystallization, or the compound or compounds which give a compound which binds water during the bonding, can be added separately. The compound which binds water of crystallization can be formed during contact between one of the materials to be joined and a separately applied compound, or during contact between the adhesive and a separately applied compound. It is also within the scope of the invention that when it is stated that a compound is present in one of the materials to be joined, this compound can be present either by having been separately applied and impregnated in the material, which can be suitable for example at the production of tubes for the paper industry, or have been applied on the surface of one of the materials to be joined, for example during the covering of floors or the bonding of wood to metal etc. It is thus possible to apply a dehydrated salt in dry form on one of the surfaces to be bonded, or to apply, in wet or dry form, a compound which is to take part in a reaction for formation of a compound capable of combining with water of crystallization. Impregnation of a material with a dehydrated compound can be carried out using a solvent-based or water-based solution of hydrated compound followed by heating of the material for release of water of crystallization from the compound.

One field in which the present method is of great importance is in the production of tubes for the paper industry, i.e. in the production of spiral wound tube formed products of board or paper board. Conventionally sodium silicate or polyvinyl alcohol are used as binders for the production of paper cores for the paper industry. These adhesives do give good adhesion, but since they can only be used with low dry contents, very long drying times are necessary. Attempts have been made to use amino-formaldehyde resins with higher dry contents in order to shorten the drying time. These attempts have, however, not given satisfactory results since it seems as if the denser glue joints which are obtained with these adhesives prevent the diffusion of water vapor from the core.

The cores which are produced for use in the paper industry should be capable of withstanding very high loads. Thick cores should for example be capable of being loaded with up to 4 tons of paper. The demands on dimensional stability are thus very high and consequently drying after bonding can generally not be carried out at temperatures above 30° C. as water would otherwise be released unevenly, resulting in shrinkage and negative effects on the dimensional stability. During the conventional production of cores it takes from 3 to 6 days and nights and up to 12, varying with the thickness of the material, the types of adhesive and the relative humidity of the drying air, to liberate the water and obtain a core ready for use.

Through binding water chemically as water of crystallization according to the method of the present invention, considerably decreased drying times during the production of cores can be obtained and at the same time a substantial increase in the strength of the product is obtained. The method of the invention is of course applicable when, during this production, conventional binders such as sodium silicate and polyvinyl alcohol are used and the present method gives a decreased drying time. It is, however, particularly preferred to make use of the chemical binding of water in combination with the use of amino-formaldehyde resins as adhesives, and preferably urea-formaldehyde resins and melamine-formaldehyde resins, mixtures and co-condensates of these.

Compounds which combine with water of crystallization and which can be used in this embodiment are compounds which have been enumerated above, and when amino-formaldehyde resins are used as binder particularly compounds with an acid reaction. Most preferably different kinds of aluminum sulphates are used either in dehydrated form or in hydrated form for reaction with other compounds which can combine with water of crystallization, and preferably also aluminum sulphates which can act as accelerators for the curing or give rise to compounds functioning as such accelerators. The model reaction given above is particularly suitable in this embodiment of bonding.

During the production of the cores the paperboard for the core can for example be impregnated with a compound which combines with water of crystallization before the gluing or with a salt having water of crystallization which can be evaporated by means of moderate heat, e.g. on the rolls in the drying section during the production of the paperboard or in the size press. Alternatively, the impregnation can be carried out in an impregnating machine. Other methods which have been described above can of course also be used in this production process, e.g. dissolution or dispersion of two compounds which do not have any water or crystallization in resins or hardeners.

During the production of cores in conventional equipment and bonding, amino-formaldehyde resin is suitably applied in an amount of from 25 to 150 g/m$^2$, as a 40 to 70% resin solution. As an example, it can be mentioned that when an aluminum sulphate is used, dehydrated or for formation of compounds which combine with water of crystallization, an amount of aluminum sulphate in the range of from about 5 to 90 g/m$^2$ is required to bind principally the entire amount of water added with the resin.

The invention is further illustrated in the following examples which, however, are not intended to limit the same. Parts and percent relate to parts by weight and percent by weight respectively, unless otherwise stated.

EXAMPLE 1

A paperboard material intended for the production of cores was impregnated with a 50% aluminum sulphate solution and dried in a continuous heating oven for removal of the water of the solution and the water of crystallization in the aluminum sulphate. The paperboard was then glued with an urea-formaldehyde resin containing 10 percent by weight of NaCl. The dry content of the adhesive was 70 percent, after the addition of NaCl. After the gluing a core was obtained which did not show any change in weight 1 hour after the gluing and up to two weeks after this. The strength of the produced core was thus fully developed after an hour or two at room temperature, which is to be compared with the traditional gluing with polyvinyl alcohol or sodium silicate where drying in a drying equipment for several days and nights and is required to obtain fully developed strength.

EXAMPLE 2

38 percent by weight of $NaNO_3$ were added to a resorcinol-phenol resin having a dry content of 56 percent by weight. A hardener solution having a dry content of 64 percent by weight was prepared from para-formaldehyde, formaldehyde, filler and water. 30 g of $K^2CO^3$ were added to the hardener solution.

Uneven material was glued and the glue joint was thick. The hardener solution and the resin solution were applied separately on two wood boards in an amount of 250 g/m$^2$ for both. The boards were pressed together using slight pressure, 0.1 kg/cm$^2$, at room temperature. After 5 minutes the joint strength had been developed to such an extent that fibre breakage occurred when testing by breaking the joint. In a corresponding gluing without the addition of the sodium nitrate and potassium carbonate (which form a compound which combines with water of crystallization-sodium carbonate,) about 40 minutes curing time was required for development of this joint strength.

The hardener and resin solutions described above were also mixed as such and the mixture cured very rapidly. The dry content before the mixing was 69.8 percent by weight and after the mixing it was 75 percent by weight. An increase of the dry content of 7.5% was thus obtained through binding of water of crystallization and thus 17.2% of the water from the resin and hardener solutions had been bound.

I claim:

1. A method of joining two or more surfaces together by
   (1) applying to at least one of the surfaces a water based adhesive or an adhesive which liberates water during curing, and
   (2) generating a salt or salts during the course of the joining operation, which salt will bind water that is present during the joining as water of crystallization.

2. A method according to claim 1 wherein said salt is generated by contact between a resin and a hardener.

3. A method according to claim 1 wherein said salt is generated upon contact of one of the surfaces to be joined and the adhesive or a component of the adhesive.

4. A method according to claim 1 wherein said salt is generated by contacting one of said surfaces and a separately applied compound.

5. A method according to claim 1 wherein at least one of said surfaces is a board or paperboard.

6. A method according to claim 1 wherein said adhesive is an aqueous solution of an amino-formaldehyde based resin.

7. A method according to claim 1 wherein said salt combines with water in at least a 1:1 mol ratio.

8. A method according to claim 1 wherein said adhesive is a curable adhesive and the salt which combines with water of crystallization or which takes part in a reaction for formation of salt/salts which combine(s) with water of crystallization is a hardener component for the adhesive.

9. A method according to claim 1 wherein water is bound as water of crystallization to a salt which is formed in connection with the joining of board or paperboard to form tube products.

10. A method according to claim 9 wherein water is bound as water of crystallization at the joining of board or paperboard to form tube products by means of an aqueous solution of an amino-formaldehyde based resin.

11. A method according to claim 9 wherein the board of paperboard is impregnated with a salt which at the joining takes part in a reaction for formation of a salt which binds water in the form of water of crystallization.

* * * * *